United States Patent
Nagai et al.

(10) Patent No.: US 11,637,460 B2
(45) Date of Patent: Apr. 25, 2023

(54) WIRELESS POWER TRANSFER SYSTEM HAVING AN ELECTRIC FIELD SHIELD MEMBER

(71) Applicant: Murata Manufacturing Co., Ltd., Kyoto-fu (JP)

(72) Inventors: Takahiro Nagai, Nagaokakyo (JP); Tatsuya Hosotani, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 33 days.

(21) Appl. No.: 17/160,233

(22) Filed: Jan. 27, 2021

(65) Prior Publication Data
US 2021/0152033 A1    May 20, 2021

Related U.S. Application Data

(63) Continuation of application No. PCT/JP2019/015017, filed on Apr. 4, 2019.

(30) Foreign Application Priority Data

Sep. 27, 2018   (JP) .............................. JP2018-181565

(51) Int. Cl.
*H02J 50/70*   (2016.01)
*H02J 50/12*   (2016.01)

(52) U.S. Cl.
CPC .............. *H02J 50/70* (2016.02); *H02J 50/12* (2016.02)

(58) Field of Classification Search
CPC . H02J 50/00; H02J 50/70; H02J 50/12; H04B 5/00; H04B 15/00
See application file for complete search history.

(56) References Cited

U.S. PATENT DOCUMENTS

| 8,749,334 B2* | 6/2014 | Boys .................... B60L 53/305 |
| | | 336/84 C |
| 2014/0197782 A1* | 7/2014 | Graf ....................... H02J 50/70 |
| | | 320/108 |

(Continued)

FOREIGN PATENT DOCUMENTS

| JP | 2014-075975 A | 4/2014 |
| JP | 2014-138551 A | 7/2014 |

(Continued)

OTHER PUBLICATIONS

International Search Report issued in PCT/JP2019/015017; dated Jun. 11, 2019.

(Continued)

*Primary Examiner* — Daniel Cavallari
*Assistant Examiner* — Joseph N Inge
(74) *Attorney, Agent, or Firm* — Studebaker & Brackett PC

(57) ABSTRACT

A wireless power transfer system includes a power transmitter including a high frequency power converter circuit that converts a direct current power into a high frequency power using a switching circuit, a power transmitter coil, and an electric field shield member close to the power transmitter coil and having a structure that uses a conductive member to form an equivalent capacitance between the electric field shield member and the power transmitter coil by electric coupling therebetween during a power transmitting operation such that the value of the equivalent capacitance becomes greater than the value of an equivalent capacitance formed between the power transmitter coil and ground. The power transmitter causes electric potentials in the electric field shield member to be identical using the conductive member, suppresses changes in an electric field (Continued)

in a vicinity of the power transmitter coil, and suppresses radiation of the electric field noise.

19 Claims, 15 Drawing Sheets

(56) References Cited

U.S. PATENT DOCUMENTS

| | | | | |
|---|---|---|---|---|
| 2016/0056664 A1* | 2/2016 | Partovi | ................. | H02J 7/0042 |
| | | | | 307/104 |
| 2016/0211702 A1* | 7/2016 | Muratov | ................. | H01F 38/14 |
| 2017/0103850 A1* | 4/2017 | Furiya | .................... | H01F 29/12 |
| 2019/0296588 A1* | 9/2019 | Muratov | ................. | H02J 50/40 |
| 2019/0393733 A1* | 12/2019 | Radchenko | ........... | H01F 27/363 |

FOREIGN PATENT DOCUMENTS

| | | | | |
|---|---|---|---|---|
| JP | 2015-008547 A | 1/2015 | | |
| JP | 2016-197931 A | 11/2016 | | |
| WO | 2012081424 A1 | 6/2012 | | |
| WO | 2013061898 A1 | 5/2013 | | |
| WO | WO-2013061610 A1 * | 5/2013 | ............ | B60L 11/182 |
| WO | WO-2013061898 A1 * | 5/2013 | ............ | H01F 27/362 |
| WO | 2017169709 A1 | 10/2017 | | |
| WO | WO-2017169709 A1 * | 10/2017 | ........... | G06K 19/077 |

OTHER PUBLICATIONS

International Preliminary Report on Patentability and Written Opinion issued in PCT/JP2019/015017; dated Mar. 23, 2021.

* cited by examiner

WIRELESS POWER TRANSFER SYSTEM HAVING AN ELECTRIC FIELD SHIELD MEMBER

CROSS-REFERENCE TO RELATED APPLICATIONS

This application claims benefit of priority to International Patent Application No. PCT/JP2019/015017, filed Apr. 4, 2019, and to Japanese Patent Application No. 2018-181565, filed Sep. 27, 2018, the entire contents of each are incorporated herein by reference.

BACKGROUND

Technical Field

The present disclosure relates to a wireless power transfer system that wirelessly transfers power from a power transmitter device to a power receiver device.

Background Art

As one of prior art wireless power transfer systems, for example, a non-contact charging device described in the Japanese Unexamined Patent Application Publication No. 2014-138551 is known. This non-contact charging device includes a first coil, a power supply unit, a stationary part, and an electrostatic shield. The first coil is connected to the power supply unit. An electronic device to be charged in a non-contact manner is placed on the stationary part. The electrostatic shield is arranged between the stationary part and the first coil. The non-contact charging device charges the electronic device in a non-contact manner via electromagnetic coupling between the first coil and a second coil of the electronic device. The electrostatic shield suppresses radio waves generated at the time of non-contact charging.

SUMMARY

In wireless power transfer systems, a challenge is how to suppress unwanted radiations generated not only from a switching circuit provided in a power transmitter device but also from a conductor part through which a high frequency current generated by this switching circuit flows or a conductor part to which a high frequency voltage is applied. In general, in the case where the power transmitter device is configured in such a manner as to suppress unwanted radiations, magnetic coupling formed between a power transmitter coil and a power receiver coil becomes weaker. This leads to a large decrease in power efficiency during a wireless power transfer operation. This poses another challenge.

The inventors of the present disclosure find out that in certain wireless power transfer systems, it is important to suppress the radiation of electric field noise caused by harmonic components while maintaining the state where changes in the magnetic field of a fundamental wave generated from the power transmitter coil are large. In the non-contact charging device described in Japanese Unexamined Patent Application Publication No. 2014-138551, the issue of radiations of harmonic noise caused by harmonic components from the first coil was not addressed.

Accordingly, the present disclosure provides a wireless power transfer system capable of suppressing harmonic noises caused by generated electric and magnetic fields while realizing a highly efficient wireless power transfer operation by keeping the state where changes in the magnetic field of a fundamental wave generated from the power transmitter coil are large and maintaining strong magnetic coupling formed between a power transmitter coil and a power receiver coil.

A wireless power transfer system according to the present disclosure includes a power transmitter device including a high frequency power converter circuit that includes a switching circuit and converts a direct current power into a high frequency power using the switching circuit, a power transmitter coil connected to an output of the high frequency power converter circuit, and an electric field shield member that suppresses electric field noise radiated from the power transmitter coil. The electric field shield member is arranged close to the power transmitter coil, and the electric field shield member has a structure that uses a conductive member to form an equivalent capacitance between the electric field shield member and the power transmitter coil by electric coupling therebetween during a power transmitting operation in such a way that value of this equivalent capacitance becomes greater than value of an equivalent capacitance formed between the power transmitter coil and earth. Thus, irrespective of various electric potential distributions in a space caused by changes in an electromagnetic field generated by a flow of a high frequency current in the power transmitter coil, the power transmitter device causes electric potentials in the electric field shield member to be identical to one another using the conductive member, suppresses changes in an electric field in a vicinity of the power transmitter coil, and suppresses radiation of the electric field noise.

The present disclosure enables to keep the state where changes in the magnetic field of a fundamental wave generated from the power transmitter coil are large, maintain strong magnetic coupling formed between the power transmitter coil and the power receiver coil, and suppress electric field noise of harmonic components in the vicinity of a noise generation source. Because of these, harmonic noises of electric field and magnetic field caused by the harmonic components can be suppressed, and a wireless power transfer system that realizes higher efficiency and lower noise is obtained.

DETAILED DESCRIPTION

Figure 1:
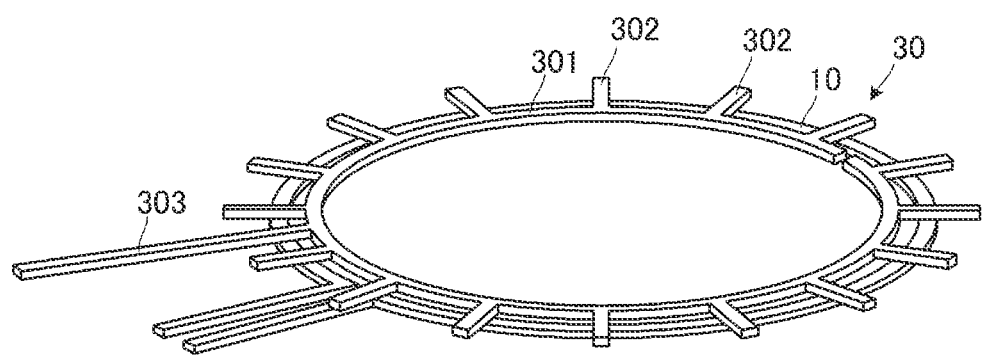
FIG. 1 is a perspective view of a power transmitter coil and an electric field shield member.

A plurality of embodiments for implementing the present disclosure is illustrated hereinafter with several specific examples while referring to the drawings. In each embodiment, points different from those of preceding embodiments are described. In particular, substantially same actions and effects produced by substantially same constituting elements will not be repeated in every embodiment.

A wireless power transfer system according to an embodiment of the present disclosure is now described. The wireless power transfer system according to the present embodiment includes a power transmitter device and a power receiver device.

Figure 2A:
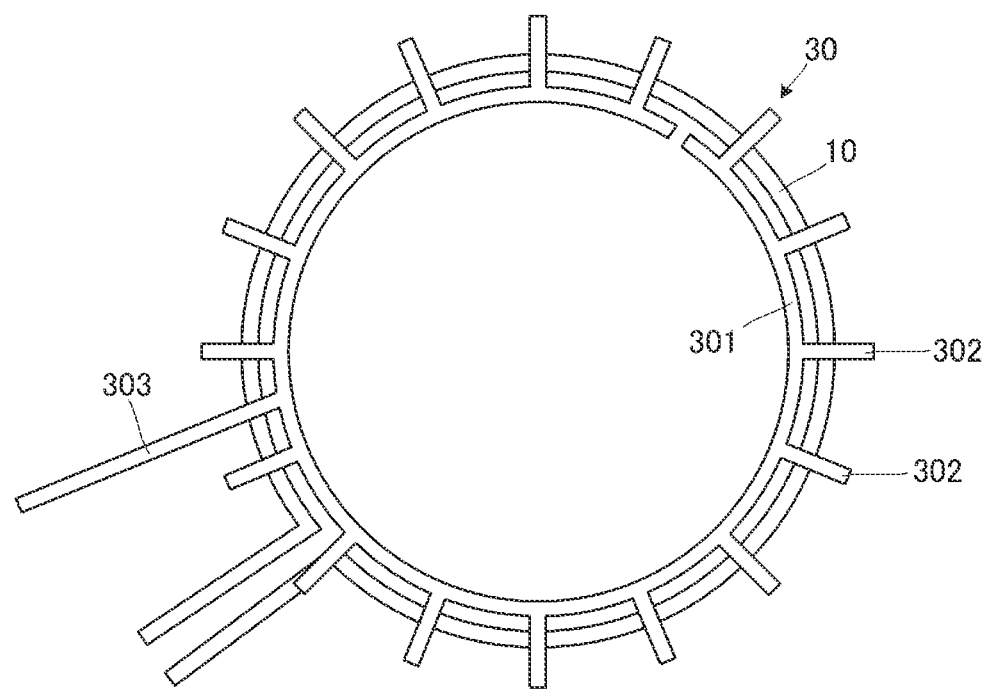
FIG. 2A is a plan view of the power transmitter coil and the electric field shield member.
Figure 2B:
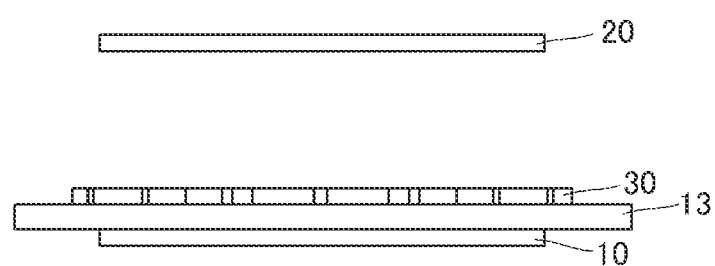
FIG. 2B is a side view of the power transmitter coil and the electric field shield member.

As illustrated in FIG. 1, FIG. 2A, FIG. 2B, and FIG. 3A, the power transmitter device includes a power transmitter coil 10, a high frequency power converter circuit 11, a direct current power source 12, and an electric field shield member 30. As illustrated in FIG. 3B, the power receiver device includes a power receiver coil 20, a rectifier circuit 21, and a load circuit 22.

FIG. 1 is a perspective view of the power transmitter coil 10 and the electric field shield member 30. FIG. 2A is a plan view of the power transmitter coil 10 and the electric field shield member 30. FIG. 2B is a side view of the power transmitter coil 10 and the electric field shield member 30. In this section, the power transmitter device according to the present embodiment is described. In FIG. 1 and FIG. 2A, an insulation sheet 13 is not illustrated. In FIG. 2B, in addition to the power transmitter coil 10 and the electric field shield member 30, the power receiver coil 20 is also illustrated.

The power transmitter device includes the power transmitter coil 10 and the electric field shield member 30 that suppresses an electric field noise radiated from the power transmitter coil 10.

The power transmitter coil 10 is formed of, for example, wound copper twisted wires. The number of turns of the power transmitter coil 10 illustrated in FIG. 1, FIG. 2A, and FIG. 2B is one. However, the number of turns of the power transmitter coil 10 may be two or more. Both ends of the power transmitter coil 10 are connected to the high frequency power converter circuit 11 via a power transmitter resonance capacitor $C_r$ (see FIG. 3A.

A conductive member is used for the electric field shield member 30. The electric field shield member 30 may be made of, for example, aluminum, copper, or iron. The electric field shield member 30 is configured to have a structure that allows to form an equivalent capacitance between the electric field shield member 30 and the power transmitter coil 10 by electric coupling therebetween during a power transmitting operation (at the time of power transfer). Specifically, the electric field shield member 30 intermittently crosses the power transmitter coil 10 in the plan view (viewed from a direction vertical to a coil opening plane of the power transmitter coil 10). The electric field shield member 30 has a substantially comb teeth shape. The electric field shield member 30 includes an open-loop shaped conductor 301 and a plurality of strip shaped conductors 302 protruding from the open-loop shaped conductor 301. The open-loop shape is a ring shape, a part of which is cut off. In the plan view, the open-loop shaped conductor 301 extends along the power transmitter coil 10 in the inner side of the power transmitter coil 10. In the plan view, the plurality of strip shaped conductors 302 protrude radially from the open-loop shaped conductor 301 and cross (overlap) the power transmitter coil 10. The strip shaped conductors 302 are arranged at substantially regular intervals along the extending direction of the open-loop shaped conductor 301. The open-loop shaped conductor 301 and the strip shaped conductors 302 are located at substantially the same plane.

In the present embodiment, the strip shaped conductors 302 and the power transmitter coil 10 are arranged to face each other. This allows the power transmitter coil 10 and electric field shield member 30 to electrically couple to each other at the time of power transfer, and an equivalent capacitance is formed between the power transmitter coil 10 and the electric field shield member 30. Furthermore, electric potentials of the plurality of strip shaped conductors 302 are made equal to each other by connecting the plurality of strip shaped conductors 302 using the open-loop shaped conductor 301.

The electric field shield member 30 is electrically connected to ground of the high frequency power converter circuit 11 and has the same electric potential as the ground of the high frequency power converter circuit 11. The electric field shield member 30 includes a terminal conductor 303 that protrudes from the open-loop shaped conductor 301 and is connected to the ground of the high frequency power converter circuit 11. Note that the electric field shield member 30 may be connected to the ground of the high frequency power converter circuit 11 via a capacitor. The electric field shield member 30 may not need to be connected to the ground.

The electric field shield member 30 is arranged in such a manner as to face the power transmitter coil 10, for example, with the insulation sheet 13 interposed therebetween. The electric field shield member 30 is arranged between the power transmitter coil 10 and the power receiver coil 20 that faces the power transmitter coil 10. In other words, the power receiver coil 20 is arranged in such a manner as to face the power transmitter coil 10 at the time of power transfer. The electric field shield member 30 is arranged between the power transmitter coil 10 and a position where the power receiver coil 20 is placed at the time of power transfer. The electric field shield member 30 is arranged on the top side of the power transmitter coil 10. On the top side of the electric field shield member 30, there is a position on which the power receiver coil 20 is to be placed at the time of power transfer. Note that the terms "top side" and "bottom side" are used for the sake of convenience to make distinction between one side and the other side.

Preferably, the electric field shield member 30 is arranged close to the power transmitter coil 10 in a structure where the value of an equivalent capacitance between the power transmitter coil 10 and the electric field shield member 30 is greater than the value of an equivalent capacitance formed between the power transmitter coil 10 and earth. Therefore, for example, the power transmitter coil 10 and the electric field shield member 30 are arranged inside a housing of the power transmitter device in such a way that the distance between the power transmitter coil 10 and the electric field shield member 30 is sufficiently shorter than the distance between the power transmitter coil 10 and the housing of the power transmitter device. As will be described below, because the equivalent capacitance between the power transmitter coil 10 and the electric field shield member 30 is greater than the equivalent capacitance between the power transmitter coil 10 and the earth, common mode noise is effectively suppressed.

Preferably, the power receiver coil 20 is arranged in such a way that the equivalent capacitance between the power transmitter coil 10 and the electric field shield member 30 becomes greater than an equivalent capacitance between the power transmitter coil 10 and the power receiver coil 20 during the power transmitting operation (at the time of power transfer). Therefore, for example, a separation distance between the power transmitter coil 10 and the electric field shield member 30 is made shorter than a separation distance between the power transmitter coil 10 and the power receiver coil 20 at the time of power transfer. As will be described below, because the equivalent capacitance between the power transmitter coil 10 and the electric field shield member 30 is greater than the equivalent capacitance between the power transmitter coil 10 and the power receiver coil 20 at the time of power transfer, effects of electric field noise on the power receiver device become smaller.

Figure 3A:
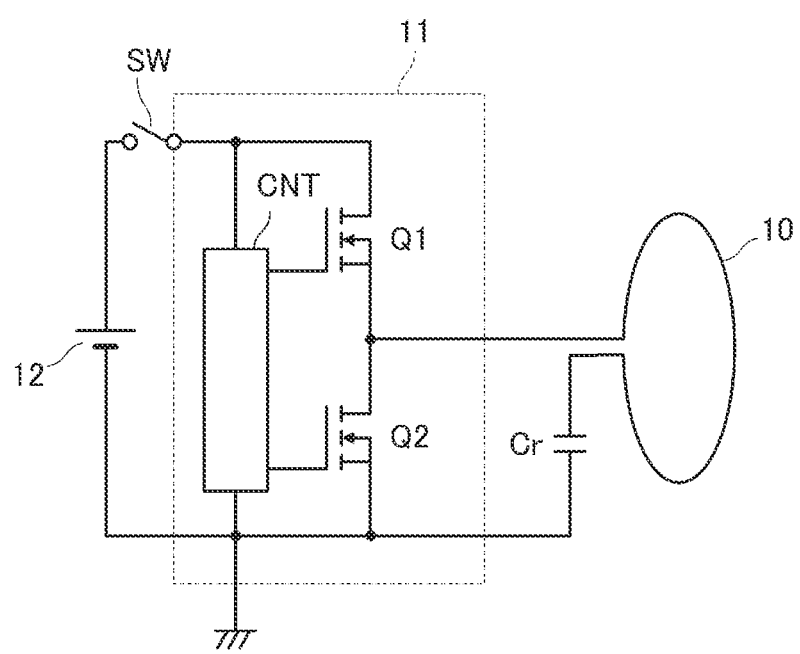
FIG. 3A is a circuit diagram of a power transmitter device according to the present embodiment.
Figure 3B:
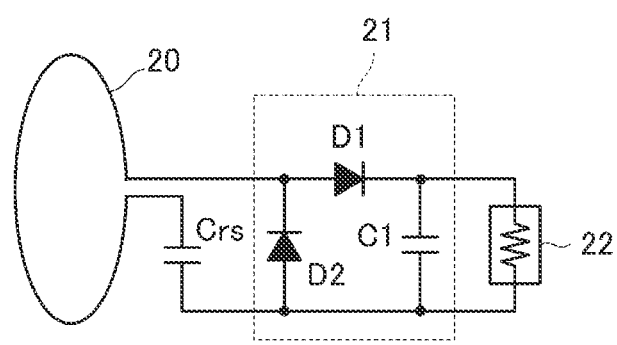
FIG. 3B is a circuit diagram of a power receiver device according to the present embodiment.

FIG. 3A is a circuit diagram of the power transmitter device according to the present embodiment. The high frequency power converter circuit 11 includes a high-side switch element Q1, a low-side switch element Q2, and a switching control circuit CNT that controls these two switch elements Q1 and Q2. The circuit including the switch elements Q1 and Q2 is an example of the "switching circuit" of the present disclosure. The high frequency power converter circuit 11 operates using the direct current power source 12 as an input power source and converts a direct current power into a high frequency power using the switch elements Q1 and Q2. A switch SW is inserted between the direct current power source 12 and the high frequency power converter circuit 11.

An output of the high frequency power converter circuit 11 is connected to the power transmitter coil 10. The power transmitter resonance capacitor $C_r$ is connected between the power transmitter coil 10 and the high frequency power converter circuit 11. The power transmitter coil 10 and the power transmitter resonance capacitor $C_r$ make up a resonant circuit by being connected to each other in series. The high frequency power converter circuit 11 is connected to the ground. For example, a metal part of the housing of the power transmitter device serves as the ground of the high frequency power converter circuit 11.

For example, the switching control circuit CNT performs switching of the switch elements Q1 and Q2 in an alternating fashion with a dead time interposed therebetween at a predetermined switching frequency in the frequency range between 6 MHz and 14 MHz inclusive. The resonant circuit made up of the power transmitter coil 10 and the power transmitter resonance capacitor $C_r$ is in resonant operation at the foregoing switching frequency. That is to say, a resonant frequency of the resonant circuit is substantially equal to the switching frequency. This causes the power transmitter coil 10 to generate a high frequency magnetic field having the switching frequency, and the power is transmitted wirelessly to the power receiver device.

Preferably, the power transmitter coil 10 has a shape similar to the shape of the power receiver coil 20. This enables to effectively strengthen magnetic coupling between the power transmitter coil 10 and power receiver coil 20, thereby achieving highly efficient power transfer.

By switching the switch elements Q1 and Q2 alternatingly as described above, a high frequency current flows through the power transmitter coil 10. Changes in an electromagnetic field generated by the flow of the high frequency current in the power transmitter coil 10 produce various electric potential distributions in a space around the power transmitter coil 10. However, the power transmitter device suppresses the radiation of electric field noise by using the electric field shield member 30 having conductivity to make electric potentials in the electric field shield member 30 equal to each other and suppress changes in an electric field in the vicinity of the power transmitter coil 10.

For example, the switching frequency may be set to 6.78 MHz that is in an Industry Science Medical (ISM) band to cause changes in the electromagnetic field generated by the flow of the high frequency current in the power transmitter coil 10 at 6.78 MHz. Alternatively, the switching frequency may be set to 13.56 MHz that is in the ISM band to cause changes in the electromagnetic field generated by the flow of the high frequency current in the power transmitter coil 10 at 13.56 MHz. By using an ISM frequency based on international standards, interference between the wireless power transfer system according to the present embodiment and communication equipment becomes acceptable.

FIG. 3B is a circuit diagram of a power receiver device according to the present embodiment. As described above, the power receiver device includes the power receiver coil 20, the rectifier circuit 21, and the load circuit 22. The power receiver coil 20 forms electromagnetic coupling with the power transmitter coil 10. In this electromagnetic coupling, magnetic coupling is dominant Electric energy is applied to the power receiver coil 20 from the power transmitter coil 10 via this magnetic coupling. The load circuit 22 is connected to the power receiver coil 20 via the rectifier circuit 21.

A power receiver resonance capacitor $C_{rs}$ is connected between the power receiver coil 20 and the rectifier circuit 21. The power receiver coil 20 and the power receiver resonance capacitor $C_{rs}$ make up a resonant circuit by being connected to each other in series.

The rectifier circuit 21 is made up of rectifier diodes D1 and D2 and a smoothing capacitor C1. The rectifier circuit 21 is a voltage doubler rectifier circuit. The rectifier circuit 21 rectifies and smooths the electromotive force of the resonant circuit made up of the power receiver coil 20 and the power receiver resonance capacitor $C_{rs}$ and supplies a direct current power to the load circuit 22.

The resonant circuit made up of the power receiver coil 20 and the power receiver resonance capacitor $C_{rs}$ is in resonant operation at a vibration frequency of the high frequency magnetic field generated in the power transmitter coil 10 of the power transmitter device. The power receiver coil 20 magnetically couples with the power transmitter coil 10 of the foregoing power transmitter device, and a current having the same frequency as the vibration frequency of the high frequency magnetic field generated by the power transmitter coil 10 flows in the power receiver coil 20. Because of this, the electromotive force of the resonant circuit is rectified and smoothed by the rectifier circuit 21, and the direct current power is supplied to the load circuit 22.

Figure 4A:
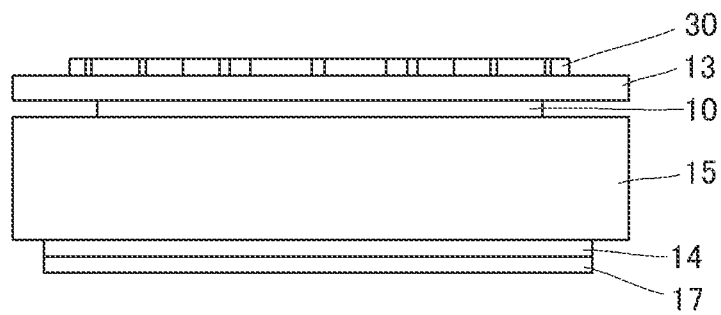
FIG. 4A is a side view illustrating a main part of a power transmitter device according to a first modified example of the present embodiment that is used for actual measurement of electric field noise.

FIG. 4A is a side view illustrating a main part of a power transmitter device according to a first modified example of the present embodiment that is used for actual measurement of electric field noise. In the first modified example, a magnetic sheet 14 is arranged on the bottom side of the power transmitter coil 10 with a spacer 15 interposed therebetween. An electric field shield member 17 is arranged on the bottom surface of the magnetic sheet 14. Note that the terms "top surface" and "bottom surface" are used for the sake of convenience to make distinction between a principal surface on one side and a principal surface on the other side.

Figure 5:
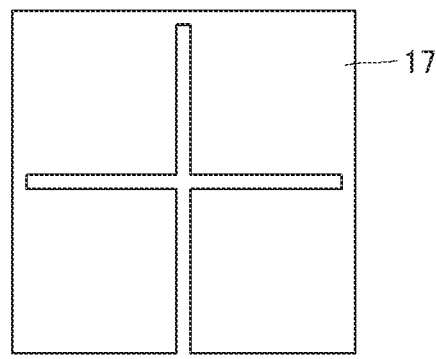
FIG. 5 is a plan view of an electric field shield member.

FIG. 5 is a plan view of the electric field shield member 17. The electric field shield member 17 is a metal foil having a substantially square shape in which a cross-shaped slit is formed. The electric field shield member 17 is connected to the ground of the high frequency power converter circuit 11.

Note that an electric field shield member having a shape similar to that of the electric field shield member 17 is also an example of the "electric field shield member" of the present disclosure.

Figure 4B:
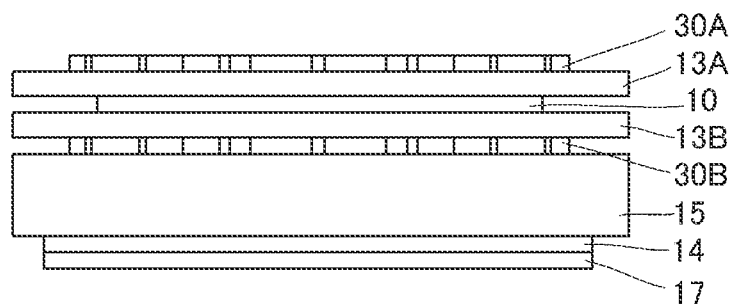
FIG. 4B is a side view illustrating a main part of a power transmitter device according to a second modified example of the present embodiment that is used for actual measurement of electric field noise.

FIG. 4B is a side view illustrating a main part of a power transmitter device according to a second modified example of the present embodiment that is used for actual measurement of electric field noise. In the second modified example, an electric field shield member 30A is arranged on the top side of the power transmitter coil 10 with an insulation sheet 13A interposed therebetween. An electric field shield member 30B is arranged on the bottom side of the power transmitter coil 10 with an insulation sheet 13B interposed therebetween. The magnetic sheet 14 is arranged on the bottom side of the electric field shield member 30B with the spacer 15 interposed therebetween. The electric field shield member 17 is arranged on the bottom surface of the magnetic sheet 14.

Figure 6A:
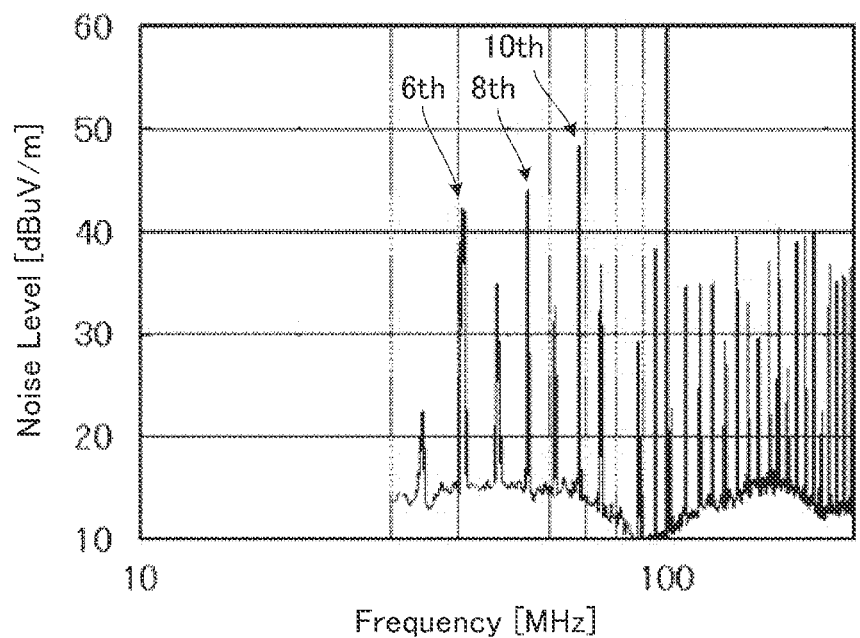
FIG. 6A and FIG. 6B are each a result of actual measurement of electric field noise radiated from a power transmitter device according to a comparative example.
Figure 6B:
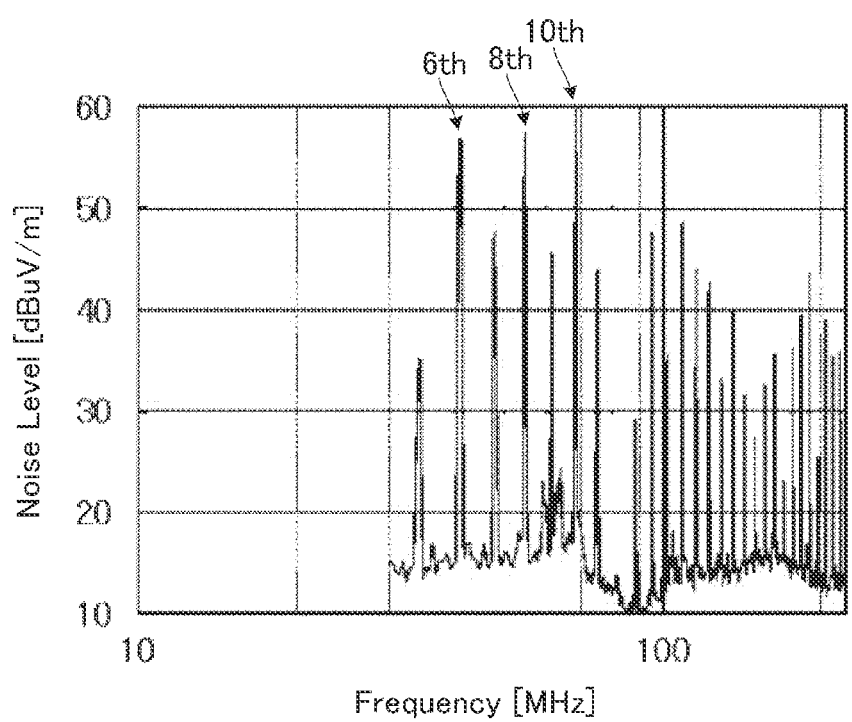

FIG. 6A and FIG. 6B are each a result of actual measurement of electric field noise radiated from a power transmitter device according to a comparative example. No electric field shield member is provided in the power transmitter device according to the comparative example. The remaining configuration is substantially the same as that of the power transmitter device according to the present embodiment.

FIG. 6A illustrates an electric field component in a direction parallel to the opening plane of the power transmitter coil 10. FIG. 6B illustrates an electric field component in a direction vertical to the opening plane of the power transmitter coil 10. Hereinafter, the electric field component in the direction parallel to the opening plane of the power transmitter coil 10 is referred to as horizontal component of electric field. The electric field component in the direction vertical to the opening plane of the power transmitter coil 10 is referred to as vertical component of electric field.

In the comparative example, the horizontal and vertical components of 6th, 8th, and 10th harmonic waves are equal to or greater than 40 dBµV/m. Thus, it is found that electric field noises caused by the 6th, 8th, and 10th harmonic waves are large.

Figure 7A:
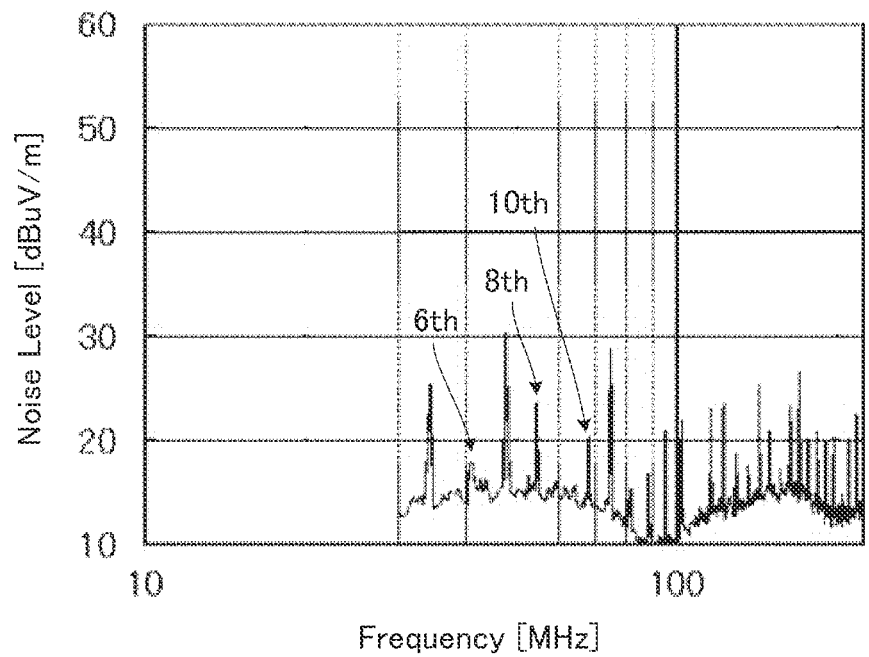
FIG. 7A and FIG. 7B are each a result of actual measurement of electric field noise radiated from a power transmitter device according to the first modified example.
Figure 7B:
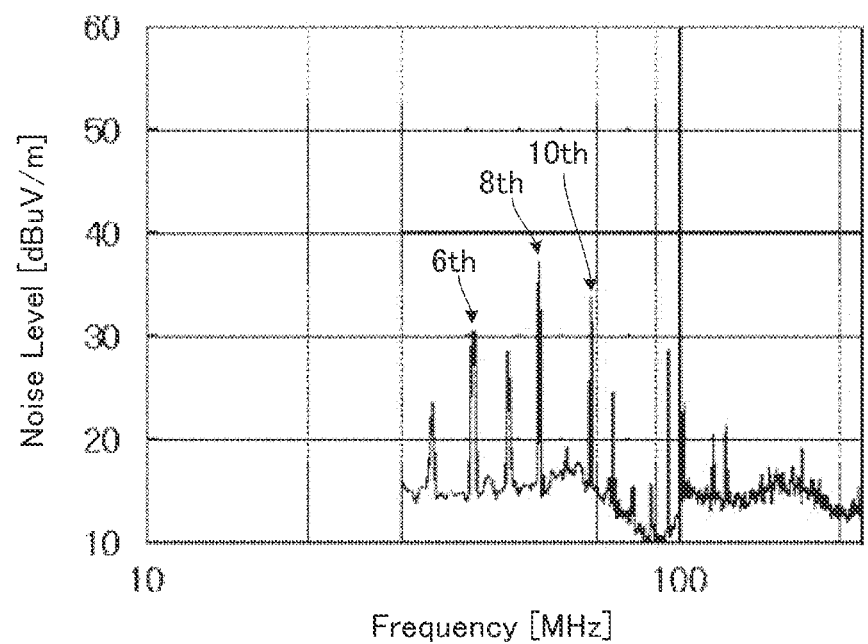

FIG. 7A and FIG. 7B are each a result of actual measurement of electric field noise radiated from the power transmitter device according to the first modified example. FIG. 7A illustrates the horizontal component of electric field. FIG. 7B illustrates the vertical component of electric field. In the first modified example, the horizontal and vertical components of 6th, 8th, and 10th harmonic waves are less than 40 dBµV/m. Thus, it is found that the electric field noises caused by the 6th, 8th, and 10th harmonic waves are suppressed.

Figure 8A:
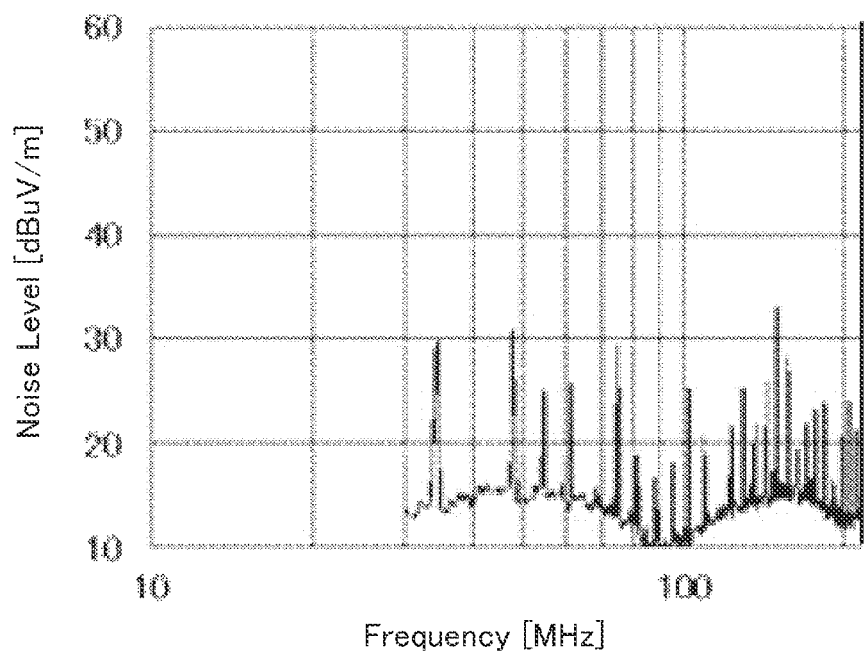
FIG. 8A and FIG. 8B are each a result of actual measurement of electric field noise radiated from a power transmitter device according to the second modified example.
Figure 8B:
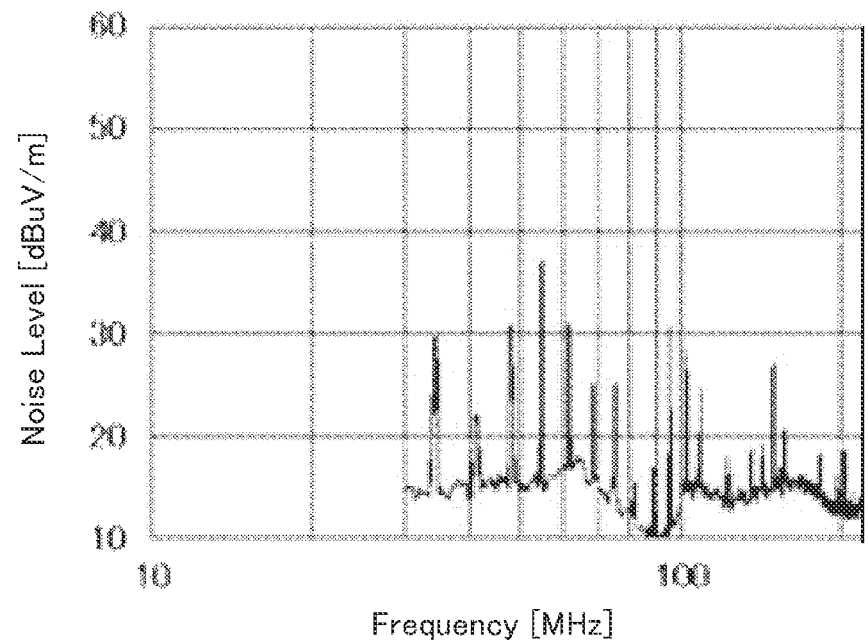

FIG. 8A and FIG. 8B are each a result of actual measurement of electric field noise radiated from the power transmitter device according to the second modified example. FIG. 8A illustrates the horizontal component of electric field. FIG. 8B illustrates the vertical component of electric field. In the second modified example, the horizontal and vertical components of 6th, 8th, and 10th harmonic waves are also less than 40 dBµV/m. Thus, it is found that the electric field noises caused by the 6th, 8th, and 10th harmonic waves are suppressed.

In the present embodiment, by switching the switch elements Q1 and Q2 alternatingly, a high frequency current flows through the power transmitter coil 10. Changes in an electromagnetic field caused by the flow of the high frequency current in the power transmitter coil 10 produce various electric potential distributions in a space around the power transmitter coil 10. Particularly, when the direct current power is being converted into the alternating current power by switching of the switch elements Q1 and Q2, the waveform of a current is distorted, and thus harmonic currents are generated. Because of flows of the harmonic currents in the power transmitter coil 10, harmonic noises are generated by the harmonic components. However, the power transmitter device suppresses the radiation of electric field noise by using the electric field shield member 30 having conductivity to make electric potentials in the electric field shield member 30 equal to each other and suppress changes in an electric field in the vicinity of the power transmitter coil 10.

This enables to maintain strong magnetic coupling formed between the power transmitter coil 10 and the power receiver coil 20 by maintaining the state where changes in the magnetic field of a fundamental wave generated from the power transmitter coil 10 are large, and enables to suppress electric field noise of harmonic components in the vicinity of a noise generation source. Because of these, harmonic noises of electric field and magnetic field caused by the harmonic components can be suppressed, a wireless power transfer system that realizes higher efficiency and lower noise is obtained.

Furthermore, the electric field shield member 30 does not make the inductance of the power transmitter coil 10 lower, and thus the decrease in Q factor of the power transmitter coil 10 is suppressed.

Furthermore, the electric field shield member 30 is made up of line-like parts and does not have an open-loop shape. As a result, an eddy current caused by a high frequency magnetic field is hardly generated in the electric field shield member 30. That is to say, the electric field shield member 30 does not exert a significant influence on the magnetic coupling between the power transmitter coil 10 and power receiver coil 20 caused by the high frequency magnetic field. Therefore, the decrease in transferring power is suppressed, and thus an even higher efficient wireless power transfer is realized.

Furthermore, the electric field shield member 30 may be formed of aluminum as described above. Although aluminum has electrical conductivity, there is hardly any difference in relative magnetic permeability between aluminum and air. Therefore, the electric field shield member 30 made of aluminum mainly acts on the electric field and can suppress a radiated electric field by effectively suppressing actions of the high frequency magnetic field and strengthening magnetic coupling between the coils. Furthermore, aluminum has the benefit of being lightweight.

Alternatively, the electric field shield member 30 may be formed of iron as described above. Iron has electrical conductivity and also has a high relative magnetic permeability. Therefore, the electric field shield member 30 made of iron may act on the magnetic field and weaken the magnetic coupling between the coils in some cases, but can effectively suppress not only the radiated electric field but also a radiated magnetic field. Furthermore, iron has the benefit of being inexpensive.

Alternatively, the electric field shield member 30 may be formed of copper as described above. Copper has electrical conductivity but has a smaller relative magnetic permeability than iron. Therefore, compared with the electric field shield member 30 made of iron, the electric field shield member 30 made of aluminum mainly acts on the electric field and can suppress the radiated electric field by suppressing actions of the high frequency magnetic field and strengthening magnetic coupling between the coils.

As described above, the power transmitter coil 10 of the power transmitter device generates the electric field noise at the time of power transfer. This means, equivalently, a noise current is output from a noise source and returns to the noise source via an equivalent capacitance (stray capacitance). Next, from the viewpoint of the noise current, the suppression of electric field noise and common mode nose is described.

Figure 9A:
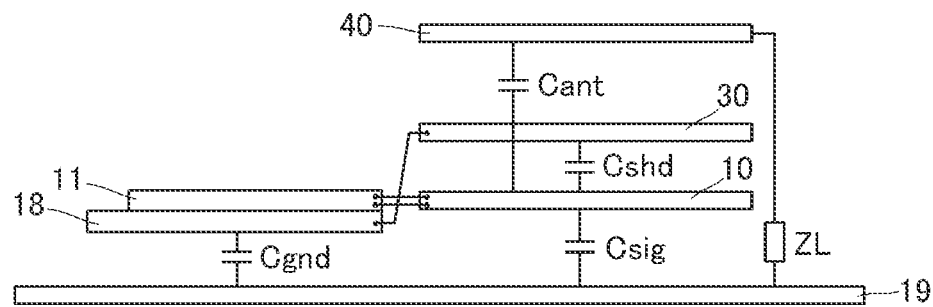
FIG. 9A is a concept view of a power transmitter device according to the present embodiment for illustrating noise current flows.

FIG. 9A is a concept view of the power transmitter device according to the present embodiment for illustrating noise current flows. An equivalent capacitance $C_{shd}$ is formed between the power transmitter coil 10 and the electric field shield member 30. An equivalent capacitance $C_{ant}$ is formed between the power transmitter coil 10 and a receiver antenna 40. The receiver antenna 40 is an antenna for observing an electric field and arranged at an electric field observation point at which the electric field is observed. An equivalent capacitance $C_{sig}$ is formed between the power transmitter coil 10 and an earth 19. An equivalent capacitance $C_{gnd}$ is formed between a ground 18 of the high frequency power converter circuit 11 and the earth 19. An impedance ZL is an equivalent impedance between the receiver antenna 40 and the earth 19.

Figure 9B:
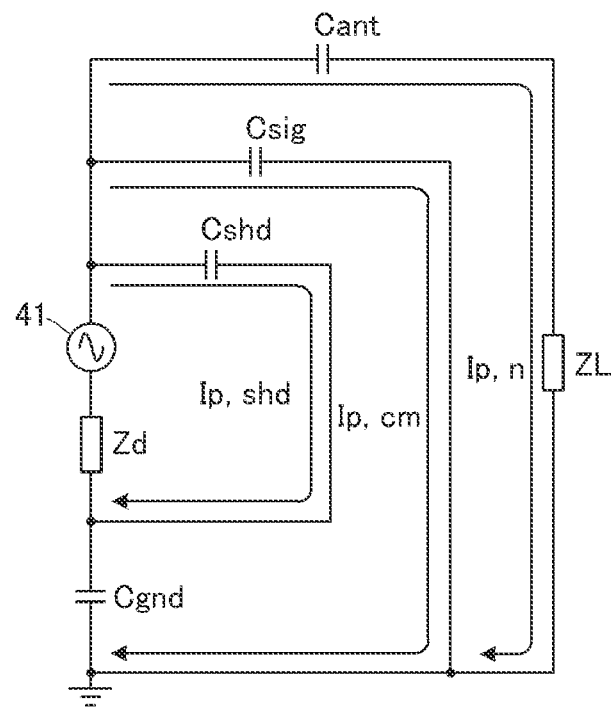
FIG. 9B is an equivalent circuit diagram of the power transmitter device according to the present embodiment for illustrating noise current flows.

FIG. 9B is an equivalent circuit diagram of the power transmitter device according to the present embodiment for illustrating noise current flows. A noise source 41 corresponds to the power transmitter coil 10. An impedance Zd is an equivalent impedance between the power transmitter coil 10 and the ground 18. In the power transmitter device according to the present embodiment, a noise current $I_{p,\ shd}$ flows via the equivalent capacitance $C_{shd}$, a noise current $I_{p,\ n}$ flows via the equivalent current $C_{ant}$, and a noise current (common mode current) $I_{p,\ cm}$ flows via the equivalent capacitance $C_{sig}$.

Figure 10A:
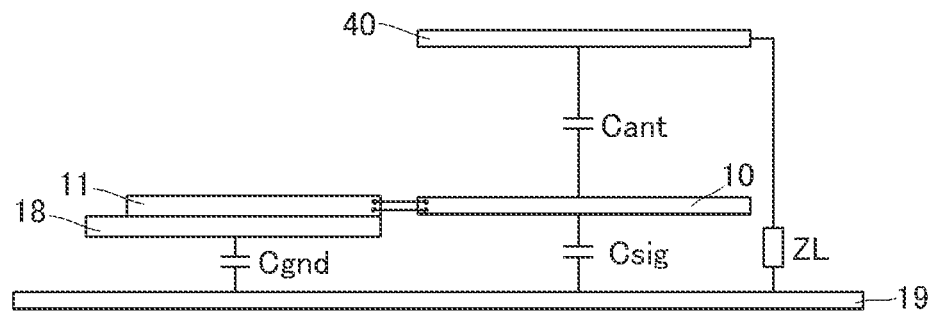
FIG. 10A is a concept view of a power transmitter device according to a comparative example for illustrating noise current flows.
Figure 10B:
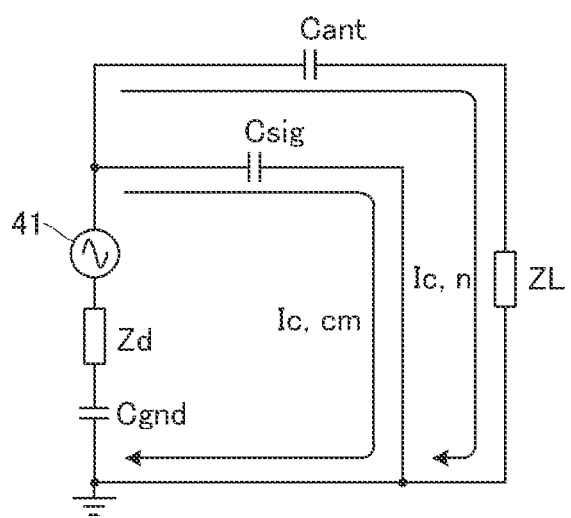
FIG. 10B is an equivalent circuit diagram of the power transmitter device according to the comparative example for illustrating noise current flows.

FIG. 10A is a concept view of a power transmitter device according to a comparative example for illustrating noise current flows. FIG. 10B is an equivalent circuit diagram of the power transmitter device according to the comparative example for illustrating noise current flows. In the power transmitter device according to the comparative example, a noise current $I_{c,\ n}$ flows via the equivalent current $C_{ant}$, and a noise current $I_{c,\ cm}$ flows via the equivalent capacitance $C_{sig}$.

In the present embodiment, the noise current $I_{p,\ shd}$ flows via the equivalent capacitance $C_{shd}$, in other words, via the electric field shield member 30. Because of this, the noise current $I_{p,\ n}$ according to the present embodiment decreases compared with the noise current $I_{c,\ n}$ according to the comparative example. Therefore, compared with the comparative example, in the present embodiment, the electric field noise at the electric field observation point is suppressed. Furthermore, it is preferable that the equivalent capacitance $C_{shd}$ is greater than the equivalent capacitance $C_{ant}$. This effectively suppresses the electric field noise at the electric field observation point.

As described above, the power receiver coil 20 is arranged in such a way that the equivalent capacitance $C_{shd}$ between the power transmitter coil 10 and the electric field shield member 30 becomes greater than the equivalent capacitance between the power transmitter coil 10 and the power receiver coil 20 at the time of power transfer. This effectively suppresses a noise current flowing through the power receiver device at the time of power transfer. Accordingly, at the time of power transfer, the electric field noise is suppressed in the vicinity of the power receiver device, and thus influences of the electric field noise on the power receiver device becomes smaller.

Furthermore, in the present embodiment, the noise current $I_{p,\ shd}$ flows. Thus, the noise current $I_{p,\ cm}$ according to the present embodiment decreases compared with the noise current $I_{c,\ cm}$ according to the comparative example. That is to say, compared with the comparative example, in the present embodiment, the common mode noise is suppressed. Furthermore, as described above, it is preferable that the equivalent capacitance $C_{shd}$ is greater than the equivalent capacitance $C_{sig}$. This effectively suppresses the common mode noise.

Figure 11A:
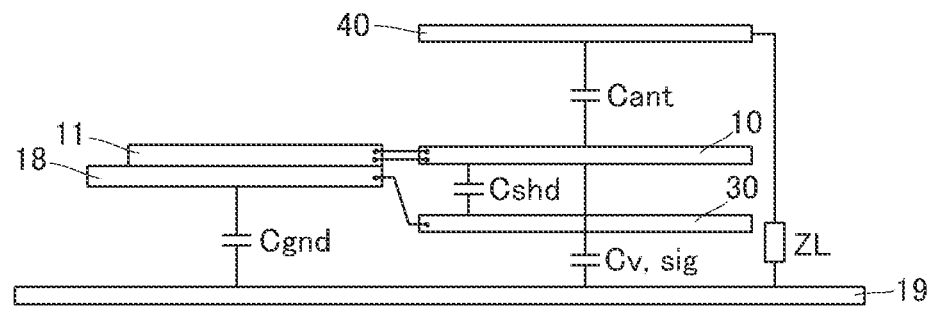
FIG. 11A is a concept view of a power transmitter device according to a third modified example of the present embodiment for illustrating noise current flows.
Figure 11B:
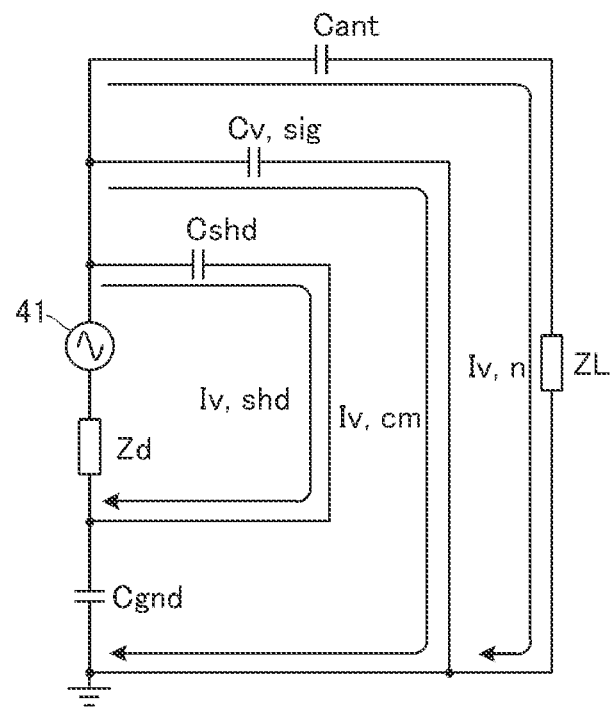
FIG. 11B is an equivalent circuit diagram of the power transmitter device according to the third modified example of the present embodiment for illustrating noise current flows.

FIG. 11A is a concept view of a power transmitter device according to a third modified example of the present embodiment for illustrating noise current flows. FIG. 11B is an equivalent circuit diagram of the power transmitter device according to the third modified example of the present embodiment for illustrating noise current flows. In the third modified example, the electric field shield member 30 is arranged between the power transmitter coil 10 and the earth 19. An equivalent capacitance $C_{v, sig}$ is formed between the power transmitter coil 10 and an earth 19. In the power transmitter device according to the third modified example, a noise current $I_{v, shd}$ flows via the equivalent capacitance $C_{shd}$, a noise current $I_{v, n}$ flows via the equivalent current $C_{ant}$, and a noise current $I_{v, cm}$ flows via the equivalent capacitance $C_{v, sig}$.

By arranging the electric field shield member 30 between the power transmitter coil 10 and the earth 19, the equivalent capacitance $C_{v, sig}$ according to the third modified example decreases compared with the equivalent capacitance $C_{sig}$ according to the comparative example. Therefore, in the third modified example, the common mode noise is suppressed further.

Figure 12A:
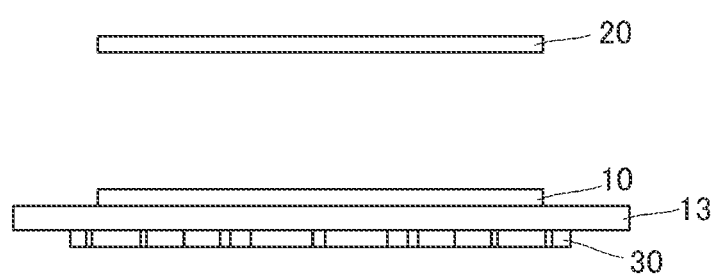
FIG. 12A is a side view illustrating a main part of a power transmitter device according to a fourth modified example of the present embodiment.

FIG. 12A is a side view illustrating a main part of a power transmitter device according to a fourth modified example of the present embodiment. In the fourth modified example, the electric field shield member 30 is arranged on not on the top side of the power transmitter coil 10, but on the bottom side of the power transmitter coil 10 with the insulation sheet 13 interposed therebetween.

Figure 12B:
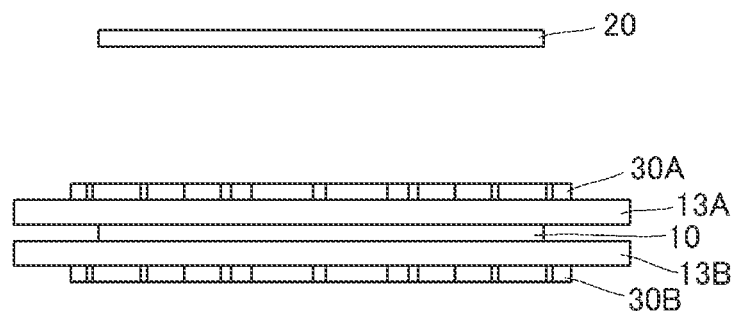
FIG. 12B is a side view illustrating a main part of a power transmitter device according to a fifth modified example of the present embodiment.

FIG. 12B is a side view illustrating a main part of a power transmitter device according to a fifth modified example of the present embodiment. In the fifth modified example, the electric field shield member 30A is arranged on the top side of the power transmitter coil 10 with the insulation sheet 13A interposed therebetween. The electric field shield member 30B is arranged on the bottom side of the power transmitter coil 10 with the insulation sheet 13B interposed therebetween. In other words, a plurality of the electric field shield members 30A and 30B is provided, and the power transmitter coil 10 is arranged among the plurality of the electric field shield members 30A and 30B.

Figure 13A:
FIG. 13A is a side view illustrating a main part of a power transmitter device according to a sixth modified example of the present embodiment.
Figure 13A:
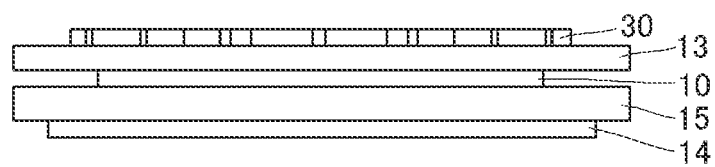

FIG. 13A is a side view illustrating a main part of a power transmitter device according to a sixth modified example of the present embodiment. In the sixth modified example, the magnetic sheet 14 is arranged on the bottom side of the power transmitter coil 10 with the spacer 15 interposed therebetween. In other words, the power transmitter device according to the third modified example includes the magnetic sheet 14, and the power transmitter coil 10 is arranged between the electric field shield member 30 and the magnetic sheet 14.

In the case where there is a metal member on the bottom side of the power transmitter coil 10, an eddy current is generated on the metal member by a high frequency magnetic field produced at the power transmitter coil 10. Because of power consumption by the eddy current, the transferring power decreases. In the sixth modified example, by forming a magnetic path passing through the inside of the magnetic sheet 14, leakage of the high frequency magnetic field to the bottom side of the magnetic sheet 14 is suppressed. Therefore, the generation of eddy current on the metal member is suppressed, and thus the decrease in transferring power is prevented.

Figure 13B:
FIG. 13B is a side view illustrating a main part of a power transmitter device according to a seventh modified example of the present embodiment.
Figure 13B:
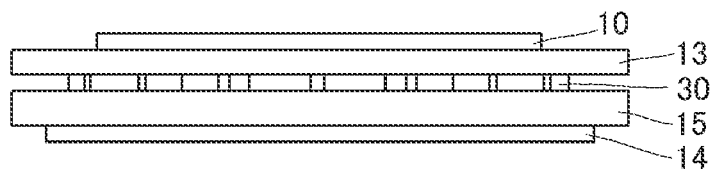

FIG. 13B is a side view illustrating a main part of a power transmitter device according to a seventh modified example of the present embodiment. In the seventh modified example, the magnetic sheet 14 is arranged on the bottom side of the electric field shield member 30 with the spacer 15 interposed therebetween. The remaining configuration is substantially the same as that of the fourth modified example (see FIG. 12A).

Figure 13C:
FIG. 13C is a side view illustrating a main part of a power transmitter device according to an eighth modified example of the present embodiment.
Figure 13C:
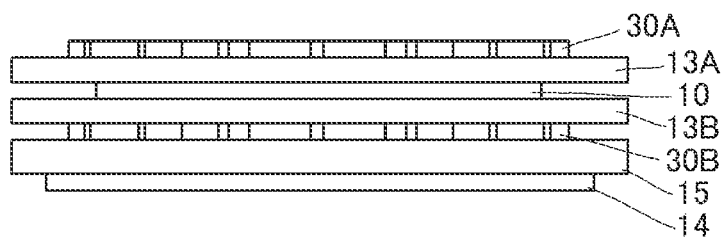

FIG. 13C is a side view illustrating a main part of a power transmitter device according to an eighth modified example of the present embodiment. In the eighth modified example, the magnetic sheet 14 is arranged on the bottom side of the electric field shield member 30B with the spacer 15 interposed therebetween. The remaining configuration is substantially the same as that of the fifth modified example (see FIG. 12B).

Figure 14A:
FIG. 14A is a cross-sectional view illustrating a main part of a power transmitter device according to a ninth modified example of the present embodiment.
Figure 14A:

FIG. 14A is a cross-sectional view illustrating a main part of a power transmitter device according to a ninth modified example of the present embodiment. In the ninth modified example, a power transmitter coil 42 and the electric field shield member 30 are included in the same multilayer substrate 16. The multilayer substrate 16 is an example of the "substrate" of the present disclosure.

Spiral conductor patterns 421 and 422 are formed on the top surface and the bottom surface of the multilayer substrate 16. Interlayer connection conductors (not illustrated) are formed in the multilayer substrate 16. By connecting the conductor patterns 421 and 422 using the interlayer connection conductors, the power transmitter coil 42 is formed. The electric field shield member 30 is formed on a middle layer of the multilayer substrate 16.

In the ninth modified example, the conductor patterns 421 and 422 of the power transmitter coil 42 are formed on the surfaces of the multilayer substrate 16. This enables to make the wire thickness of the power transmitter coil thicker, compared with the case where the power transmitter coil is formed on a middle layer of the multilayer substrate 16. Accordingly, the Q-factor of the power transmitter coil can be increased, compared with the case where the power transmitter coil is formed on a middle layer of the multilayer substrate 16.

Note that depending on usage, the power transmitter coil and the electric field shield member may be included in the same multilayer substrate, and the electric field shield member may be arranged on at least one of the top side and the bottom side of the power transmitter coil.

Figure 14B:
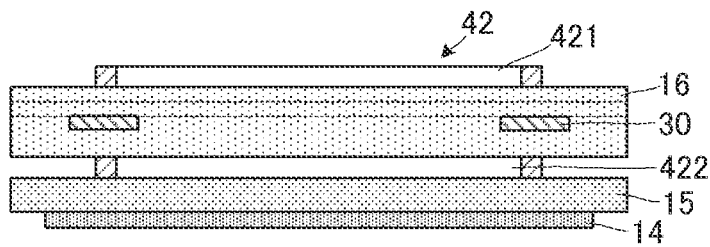
FIG. 14B is a cross-sectional view illustrating a main part of a power transmitter device according to a tenth modified example of the present embodiment.

FIG. 14B is a cross-sectional view illustrating a main part of a power transmitter device according to a tenth modified example of the present embodiment. In the tenth modified example, the magnetic sheet 14 is arranged on the bottom side of the conductor pattern 422 with the spacer 15 interposed therebetween. The remaining configuration is substantially the same as that of the ninth modified example (see FIG. 14A).

Figure 15:
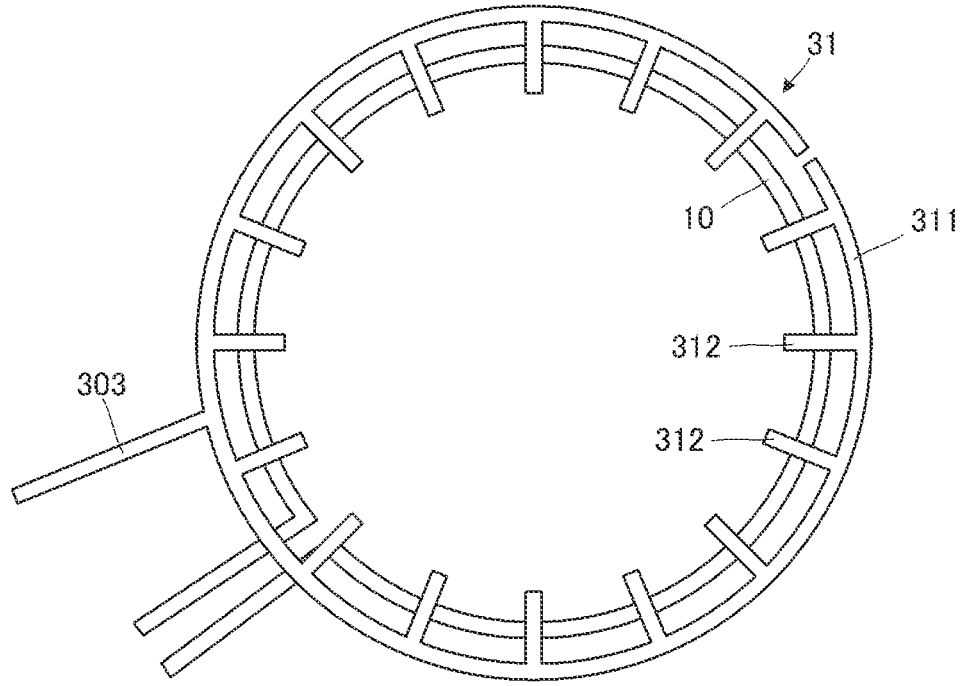
FIG. 15 is a plan view of an electric field shield member according to an eleventh modified example of the present embodiment.

FIG. 15 is a plan view of an electric field shield member 31 according to an eleventh modified example of the present embodiment. The electric field shield member 31 includes an open-loop shaped conductor 311 and a plurality of strip shaped conductors 312. In the plan view, the open-loop shaped conductor 311 extends along the power transmitter coil 10 in the outer side of the power transmitter coil 10. In the plan view, the strip shaped conductors 312 protrude from the open-loop shaped conductor 311 toward the inner side thereof and cross the power transmitter coil 10.

Figure 16:
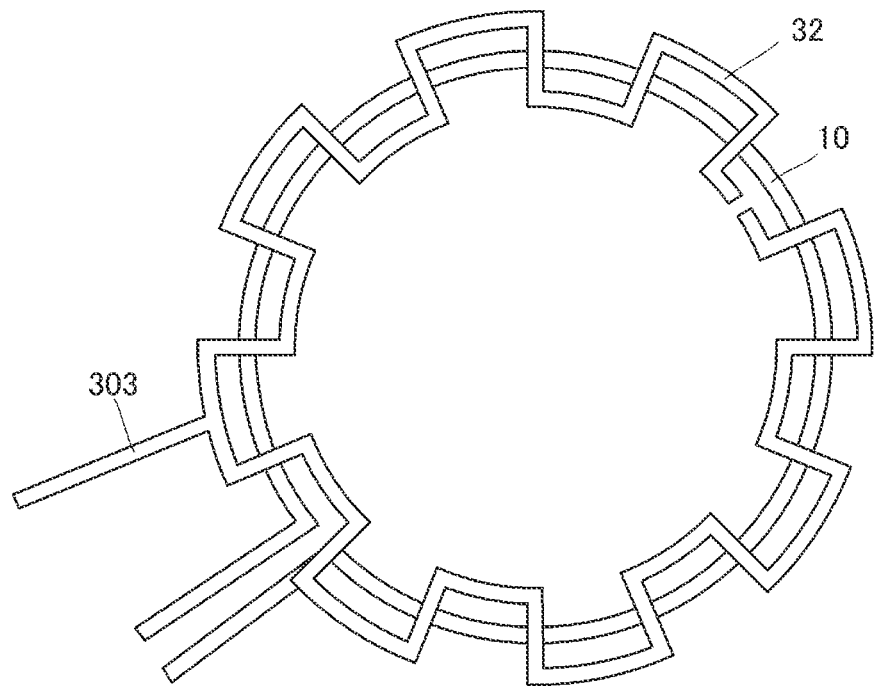
FIG. 16 is a plan view of an electric field shield member according to a twelfth modified example of the present embodiment.

FIG. 16 is a plan view of an electric field shield member 32 according to a twelfth modified example of the present embodiment. The electric field shield member 32 has a substantially meander shape. In the plan view, the electric field shield member 32 extends along the power transmitter coil 10 while crossing the power transmitter coil 10.

Figure 17:
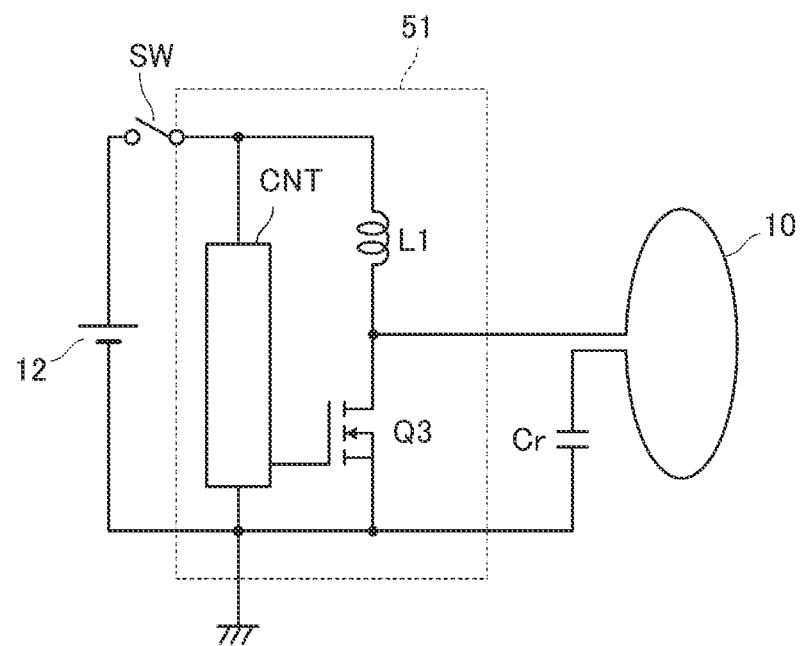
FIG. 17 is a circuit diagram of a power transmitter device according to a thirteenth modified example of the present embodiment.

FIG. 17 is a circuit diagram of a power transmitter device according to a thirteenth modified example of the present embodiment. This power transmitter device includes a high frequency power converter circuit 51. The high frequency power converter circuit 51 includes an inductive element L1, a switch element Q3, and a switching control circuit CNT that controls the switch element Q3. The circuit including the inductive element L1 and the switch element Q3 is an example of the "switching circuit" of the present disclosure. The high frequency power converter circuit 51 operates using the direct current power source 12 as an input power source and converts a direct current power into a high frequency power using the inductive element L1 and the switch element Q3.

Figure 18:
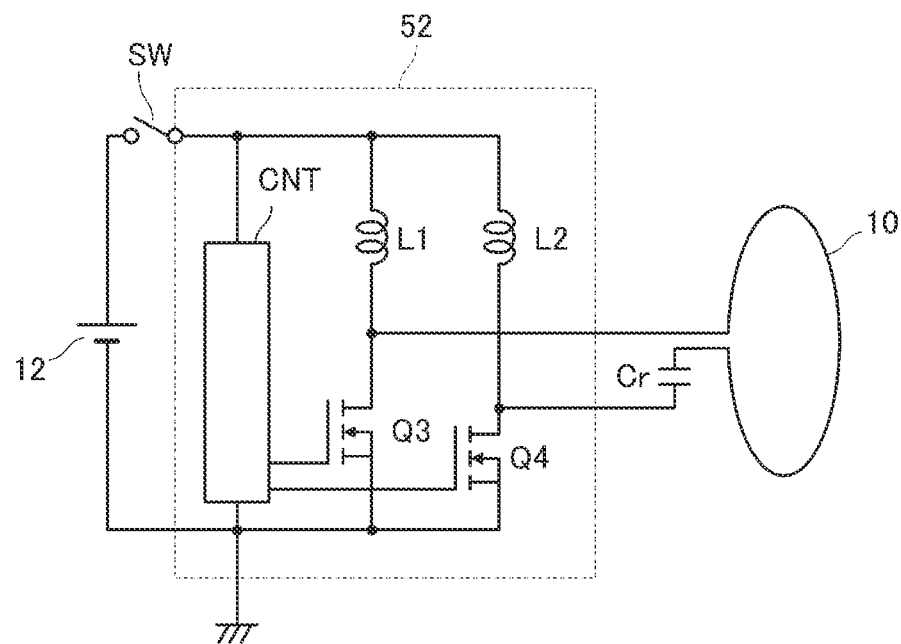
FIG. 18 is a circuit diagram of a power transmitter device according to a fourteenth modified example of the present embodiment.

FIG. 18 is a circuit diagram of a power transmitter device according to a fourteenth modified example of the present embodiment. This power transmitter device includes a high frequency power converter circuit 52. The high frequency power converter circuit 52 includes inductive elements L1 and L2, switch elements Q3 and Q4, and a switching control circuit CNT that controls the switch elements Q3 and Q4. The circuit including the inductive elements L1 and L2 and the switch elements Q3 and Q4 is an example of the "switching circuit" of the present disclosure. The high frequency power converter circuit 52 operates using the direct current power source 12 as an input power source and converts a direct current power into a high frequency power using the inductive elements L1 and L2 and the switch elements Q3 and Q4.

Lastly, the foregoing descriptions of the embodiments are exemplary in all aspects and are not restrictive. For a person skilled in the art, modifications and alterations are possible if appropriate. Needless to say, constituting elements illustrated in different embodiments may be partially combined or exchanged. The scope of the present disclosure is described by the claims and not by the foregoing embodiments. Furthermore, it is intended that the scope of the present disclosure includes all the variations which come within the scope of the claims and the meaning and the scope of equivalency of the claims.

What is claimed is:

1. A wireless power transfer system comprising:
   a power transmitter including a high frequency power converter circuit that includes a switching circuit and that is configured to convert a direct current power into a high frequency power using the switching circuit, a power transmitter coil connected to an output of the high frequency power converter circuit, and at least one electric field shield member configured to suppress electric field noise radiated from the power transmitter coil, wherein
   the electric field shield member is arranged proximate to the power transmitter coil, the electric field shield member includes an open-loop shaped conductor having a curvature which follows a curvature of the power transmitter coil, the electric field shield member includes a plurality of strip shaped conductors protruding from the open-loop shaped conductor and crossing the power transmitter coil, and the electric field shield member has a structure that uses a conductive member to create an equivalent capacitance between the electric field shield member and the power transmitter coil by electric coupling therebetween during a power transmitting operation to cause a value of the equivalent capacitance to become greater than a value of an equivalent capacitance that is between the power transmitter coil and ground,
   irrespective of various electric potential distributions in a space caused by changes in an electromagnetic field generated by a flow of a high frequency current in the power transmitter coil, the power transmitter causes electric potentials in the electric field shield member to be identical to one another using the conductive member, suppresses changes in an electric field in a vicinity of the power transmitter coil, and suppresses radiation of the electric field noise, and
   one of the following:
     an inner perimeter and an outer perimeter of the open-loop shaped conductor are each smaller than an inner perimeter of the power transmitter coil, or
     the inner perimeter and the outer perimeter of the open-loop shaped conductor are each larger than an outer perimeter of the power transmitter coil.

2. The wireless power transfer system according to claim 1, wherein
   the electric field shield member is electrically connected to a ground of the high frequency power converter circuit.

3. The wireless power transfer system according to claim 1, further comprising:
   a power receiver coil configured to create electromagnetic coupling with the power transmitter coil; and
   a load circuit connected to the power receiver coil.

4. The wireless power transfer system according to claim 3, wherein
   the electric field shield member is arranged between the power transmitter coil and the power receiver coil facing thereto.

5. The wireless power transfer system according to claim 1, wherein
   the power transmitter comprises a plurality of the electric field shield members, and
   the power transmitter coil is arranged among the plurality of the electric field shield members.

6. The wireless power transfer system according to claim 1, wherein
   the power transmitter further includes a magnetic sheet, and
   the power transmitter coil is arranged between the electric field shield member and the magnetic sheet.

7. The wireless power transfer system according to claim 1, wherein
   the power transmitter coil and the electric field shield member are included in a same substrate.

8. The wireless power transfer system according to claim 1, wherein
   the electric field shield member is made of aluminum.

9. The wireless power transfer system according to claim 1, wherein
   the electric field shield member is made of copper.

10. The wireless power transfer system according to claim 1, wherein
    the electric field shield member is made of iron.

11. The wireless power transfer system according to claim 1, wherein
    in the power transmitting operation, a switching frequency is set to 6.78 MHz, which is in an ISM band, to cause changes in the electromagnetic field generated by the flow of the high frequency current in the power transmitter coil at 6.78 MHz.

12. The wireless power transfer system according to claim 1, wherein
    in the power transmitting operation, a switching frequency is set to 13.56 MHz, which is in an ISM band, to cause changes in the electromagnetic field generated by the flow of high frequency current in the power transmitter coil at 13.56 MHz.

13. A wireless power transfer system comprising:
a power transmitter including a high frequency power converter circuit that includes a switching circuit and that is configured to convert a direct current power into a high frequency power using the switching circuit, a power transmitter coil connected to an output of the high frequency power converter circuit, and an electric field shield member configured to suppress electric field noise radiated from the power transmitter coil, the electric field shield member including an open-loop shaped conductor having a curvature which follows a curvature of the power transmitter coil, the electric field shield member includes a plurality of strip shaped conductors protruding from the open-loop shaped conductor and crossing the power transmitter coil, and one of the following:
  an inner perimeter and an outer perimeter of the open-loop shaped conductor are each smaller than an inner perimeter of the power transmitter coil, or
  the inner perimeter and the outer perimeter of the open-loop shaped conductor are each larger than an outer perimeter of the power transmitter coil; and
a power receiver including a power receiver coil to which electric energy is applied from the power transmitter coil and a load circuit connected to the power receiver coil, wherein
the power receiver coil is arranged such that an equivalent capacitance between the power transmitter coil and the electric field shield member becomes greater than an equivalent capacitance between the power transmitter coil and the power receiver coil during a power transmitting operation.

14. The wireless power transfer system according to claim 13, wherein
a separation distance between the power transmitter coil and the electric field shield member is shorter than a separation distance between the power transmitter coil and the power receiver coil.

15. The wireless power transfer system according to claim 13, wherein
in the power transmitting operation, a switching frequency is set to 6.78 MHz, which is in an ISM band, to cause changes in the electromagnetic field generated by the flow of the high frequency current in the power transmitter coil at 6.78 MHz.

16. The wireless power transfer system according to claim 13, wherein
in the power transmitting operation, a switching frequency is set to 13.56 MHz, which is in an ISM band, to cause changes in the electromagnetic field generated by the flow of high frequency current in the power transmitter coil at 13.56 MHz.

17. A wireless power transfer system comprising:
a power transmitter including a high frequency power converter circuit that includes a switching circuit and that is configured to convert a direct current power into a high frequency power using the switching circuit, a power transmitter coil connected to an output of the high frequency power converter circuit, and an electric field shield member configured to suppress electric field noise radiated from the power transmitter coil, the electric field shield member including an open-loop shaped conductor having a curvature which follows a curvature of the power transmitter coil; and
a power receiver including a power receiver coil to which electric energy is applied from the power transmitter coil and a load circuit connected to the power receiver coil, wherein
the power receiver coil is arranged such that an equivalent capacitance between the power transmitter coil and the electric field shield member becomes greater than an equivalent capacitance between the power transmitter coil and the power receiver coil during a power transmitting operation, and
the electric field shield member intermittently crosses the power transmitter coil in a plan view, such that first portions of the open-loop shaped conductor are positioned within an inner perimeter of the power transmitter coil and second portions of the open-loop shaped conductor are positioned outside of an outer perimeter of the power transmitter coil, and the first and second portions are alternately positioned about a perimeter of the open-loop shaped conductor.

18. The wireless power transfer system according to claim 17, wherein
the electric field shield member includes a plurality of strip shaped conductors protruding from the open-loop shaped conductor.

19. The wireless power transfer system according to claim 17, wherein
the electric field shield member has a substantially meander shape.

* * * * *